Patented July 10, 1951

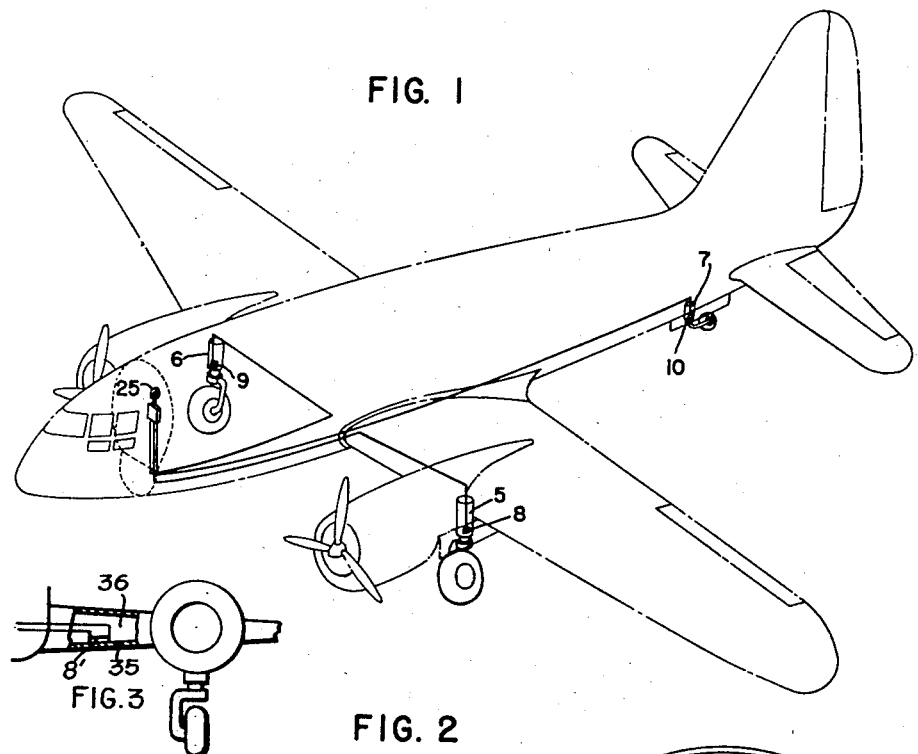
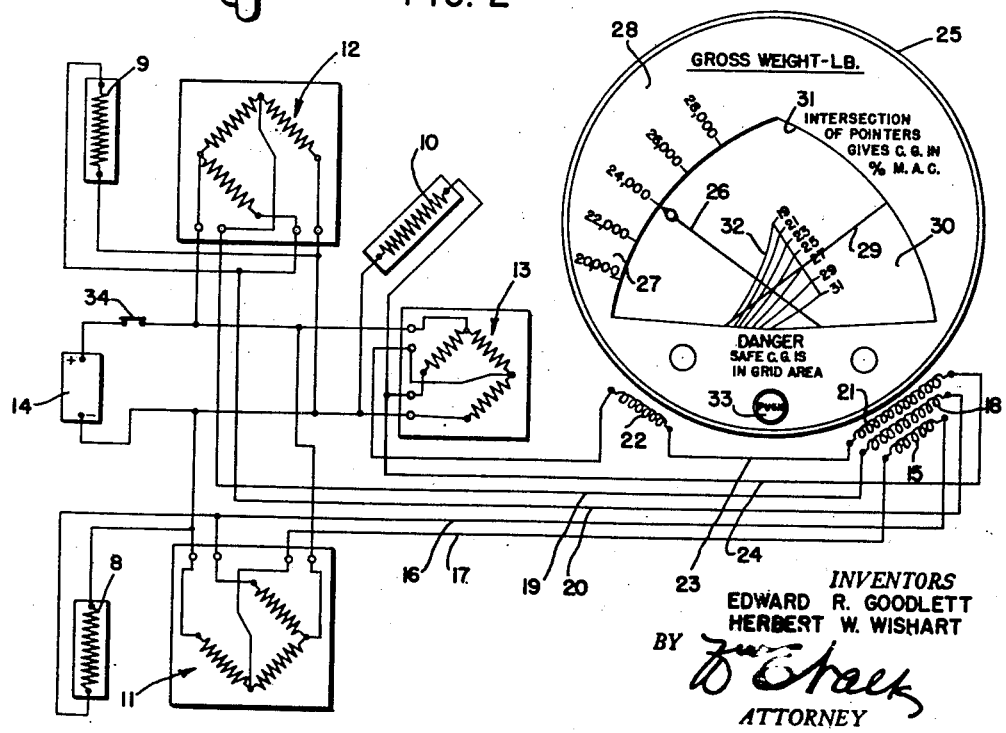

2,559,718

UNITED STATES PATENT OFFICE 2,559,718

WEIGHT AND CENTER OF GRAVITY INDICATOR

Edward R. Goodlett, Ferguson, and Herbert W. Wishart, University City, Mo., assignors to Curtiss-Wright Corporation, a corporation of Delaware Application May 26, 1944, Serial No. 537,452

14 Claims. (Cl. 73—65)

This invention relates to a load distribution indicator which, although not necessarily limited to such use, is characterized by features which render it of particular utility in connection with the loading of aircraft, being available when so employed to indicate any position of the center of gravity of the aircraft as may be occasioned by the distribution of the load and thereby enabling the loading to be conducted in such a manner that the location of the center of gravity may be maintained within predetermined safe and efficient limits.

One object of the invention is to provide an indicator of the character generally described which may be incorporated in an aircraft as a permanently-carried accessory.

A further object is to provide an indicator which is adapted not only to show the position of the center of gravity but which is also operative to indicate the weight of the load.

A still further object is an indicator which is so designed that the weight of the load and the location of the center of gravity are indicated simultaneously.

A still further object is to provide an indicator which is adapted to show the location of the center of gravity in such a manner that any displacement thereof with relation to permissible displacement may be observed at any stage of loading.

A still further object is an indicator which is simple in design and light in weight, which may be installed with facility and which may be applied to existing aircraft or be incorporated in new aircraft with a minimum of structural changes.

The invention contemplates an indicator which is so designed that the deformation of the load-bearing members by the load may be availed of in obtaining the weight of the load and the location or disposition of the center of gravity of the load-carrying structure in the direction of its principal longitudinal axis. To this end the indicator includes conductor elements, commonly referred to as strain gauges, of the type adapted to offer a resistance to the flow of electric current which varies in accordance with the degree to which they are stressed, the said elements being associated with the load-carrying members in such a manner that any changes in the stressing of the said members causes, or is accompanied by, corresponding changes in the stressing of the conductor elements. The latter are connected in Wheatstone bridges in such a manner that current outputs may be obtained from the bridges which will be directly proportional to the weight of the load and to the displacement of the center of gravity caused by the load and hence which may be translated into, and indicated in, appropriate units.

The indicator is illustrated in the accompanying drawing wherein:

Figure 1 is a perspective view of an airplane carrying an indicator embodying the features of the invention.

Figure 2 is a wiring diagram of the indicator.

Fig. 3 is a front view, partly broken away, of a portion of the airplane shown in Fig. 1 illustrating a modified application of the invention.

The indicator is illustrated by way of example in connection with an airplane of the cargo type, the main struts of the landing gear being indicated at 5 and 6 while the tail wheel strut is indicated at 7. The said struts constitute three primary points of support and are subjected to strains proportional to the load which they bear. In accordance with the invention, strain gauges 8 and 9 are bonded, or otherwise applied, to the struts 5 and 6, respectively, while a similar gauge 10 is applied to the tail wheel strut 7. The strain gauges may be of any suitable type so long as they are sensitive to the degree necessary and responsive to strut strain throughout the range of loads involved. As axial distortion only is availed of in the embodiment of the invention illustrated, the strain gauges are arranged so that they have maximum sensitivity with respect to distortion in such direction. Referring to Figure 2, it will be noted that the strain gauge 8 is utilized as an arm of a Wheatstone bridge 11 while the strain gauges 9 and 10 provide arms of similar bridges 12 and 13, respectively. Those arms of the bridges other than those provided by the strain gauges may be arranged in a suitable box which may be attached to the airplane in any convenient location.

Current is supplied to the bridges 11, 12 and 13 from a battery 14, the said bridges preferably being initially adjusted so that they are balanced, and hence have no output, when the airplane is unloaded. It will thus be apparent that as the airplane is loaded, the increased strain in the struts 5, 6 and 7 will be accompanied by a reduction in the resistance of the strain gauges 8, 9 and 10. The bridges 11, 12 and 13 thereby become unbalanced, such unbalance increasing directly as the weight of the load increases. Any unbalance of the bridge 11 is accompanied by a corresponding flow of current through a coil 15 which is connected across the bridge by lines 16 and 17; any unbalance of the bridge 12 is accompanied by a corresponding flow of current through a coil 18 which is connected across the bridge 12 by lines 19 and 20; and any unbalance of the bridge 13 is accompanied by a corresponding flow of current through a coil 21 and a coil 22 which are connected in series across the bridge 13 by lines 23 and 24.

From the foregoing it will be apparent that for any particular load, current in proportion to such load will be caused to traverse the coils 15, 18 and 21, the current flowing through each of the said coils bearing the same relation to the total current flow as that portion of the load producing such flow bears to the total load. Hence the three coils may be wound to provide the moving coil of a dual galvanometer 25. A pointer 26 which is actuated by the moving coil traverses indicia such as a scale 27, calibrated in pounds and carried by an outer dial 28, the magnitude of the deflection of the pointer 26 being in proportion to the total current through the coils 15, 18 and 21. Hence the weight of the load will be indicated by the pointer 26.

The coil 22 which is in series with the coil 21 may also be utilized as the moving coil of the galvanometer, a pointer 29 which is actuated by the moving coil traversing an inner dial 30. The latter is visible through an opening 31 formed in the outer dial and is provided with indicia such as a grid 32 calibrated in terms of percentage of the mean aerodynamic chord (M. A. C.) of the airplane, the pointer 29 being movable in a plane behind the plane traversed by the pointer 26.

The magnitude of the deflection of the pointer 26 is proportional to the flow of bridge current caused by the total weight of the load whereas the magnitude of deflection of the pointer 29 is proportional only to the flow of bridge current caused by that portion of the total weight of the load which is borne by the tail wheel strut. Hence the dial 30 may be calibrated so that the pointers 26 and 29 cross one another directly over the point on the grid 32 which designates the location of the center of gravity resulting from the load shown on the dial 28, the grid 32 being so laid out that so long as the pointers 26 and 29 intersect over it the distribution of the particular load is satisfactory. In this connection it is to be understood that, although the graduations on the grid 32 indicate the location of the center of gravity in terms of percentage of the mean aerodynamic chord, this is not necessary. For example, the grid area may be of a solid color and all graduations eliminated. Any distribution of the load which causes the pointers to intersect outside the limits of the grid is unsafe, inefficient, or both, and calls for corrective measures either by changing the distribution of the existing load, or by the proper distribution of any additional load. The pointer 26 thus not only indicates the weight of the load but it also cooperates with the pointer 29 to indicate the location of the center of gravity. Both indications are given simultaneously together with an indication of the relation which the center of gravity location bears with respect to permissible locations. All factors required to be known to enable the airplane to be properly loaded are, therefore, shown on the indicator.

The galvanometer may, as illustrated, include a push button 33, the latter being available to close momentarily a normally open switch 34 whenever it is desired to take a reading or, if desired, to hold said switch closed during the entire loading operations.

It is to be understood that the strain gauges of the indicator need not necessarily be applied to the struts of the landing and tail wheels of the airplane. Other members of the latter such as the principal beams or spar members of the wings are similarly stressed by the loads and hence may, if desired, be availed of in the same manner as the struts. For example, Fig. 3 illustrates the application of the invention to the wing structure of the airplane. In this case, the strain gage 8' corresponding to the gage 8 in Fig. 1 is mounted upon the lower or tension flange 35 of a wing spar 36. Accordingly, the gage 8' will reflect change in airplane loading as in the case of gage 8 since for a change of ground load of the airplane, there will be a change of load on the spar 36 corresponding to the change of load on the landing gear strut 5.

We claim as our invention:

1. In an aircraft having three ground load supports, one of the supports being spaced horizontally from the other two supports in a direction substantially transverse to a line connecting said other two supports, the combination therewith of means for showing the position of the aircraft center of gravity in said substantially transverse direction, said means comprising: an electrical circuit in the aircraft for each of said supports, each circuit including means mounted upon the related support for varying the current output of the circuit in accordance with variation in load of the aircraft borne by the related support, an indicator in the aircraft and connected electrically with said circuits, said indicator having a first means movable in response to variation in total current output of all of said circuits and having a second means movable in response to current output of the circuit for said one of the supports, an indicator hand movable by each of said movable means, said indicator hands intersecting in various positions thereof, and the indicator having a scale arranged to show the position of the center of gravity of the aircraft in said substantially transverse direction as determined by the point of intersection of said hands.

2. In an aircraft having three ground load supports, one of the supports being spaced horizontally from the other two supports in a direction substantially transverse to a line connecting said other two supports, the combination therewith of means for showing the position of the aircraft center of gravity in said substantially transverse direction, said means comprising: an electrical circuit in the aircraft for each of said supports, each circuit including means mounted upon the related support for varying the current output of the circuit in accordance with variation in load of the aircraft borne by the related support, an indicator in the aircraft and connected electrically with said circuits, said indicator having a first member movable in response to variation in total current output of all of said circuits and having a second member movable in response to current output of the circuit for said one of the supports, said first and second indicator members being located in mutually co-acting position relationship on said indicator and the indicator having means to show the position of the center of gravity of the aircraft in said substantially transverse direction as determined by the co-acting relative positions of both said movable members with respect to said last-named means.

3. In an aircraft having three ground load supports, one of the supports being spaced horizontally from the other two supports in a direction substantially transverse to a line connecting said other two supports, the combination therewith of means for showing the position of the aircraft center of gravity in said substantially transverse direction, said means comprising: an electrical circuit in the aircraft for each of said supports, each circuit including means mounted upon the related support for varying the current output of the circuit in accordance with variation in load of the aircraft borne by the related support, an indicator in the aircraft and connected electrically with said circuits, said indicator having a dial and having a first means movable relative to the dial in response to variation in total current output of all of said circuits and also having a second means movable relative to the dial in response to current output of the circuit for said one of the supports, an indicator element carried by each of said movable means, said indicator elements intersecting and being movable in a plane parallel to the dial, and the dial having indicia arranged to show the position of the center of gravity of the aircraft in said substantially transverse direction as determined by the point of intersection of said hands.

4. In an aircraft having first ground load support means disposed to one side of the aircraft center of gravity and second ground load support means disposed to the opposite side of the aircraft center of gravity, the combination therewith of means for indicating the position of the aircraft center of gravity along a reference line extending substantially between said first and said second ground load support means, said indicating means comprising: an electrical circuit means in the aircraft for each of said support means, each circuit means including means mounted upon the related support means for varying the current output of the circuit in accordance with the load of the aircraft borne by the related support means; an indicator having a dial, a first means movable in response to variation in total current output of both of said circuit means, a second means movable in response to current output variation of one of said circuit means, an indicator hand movable upon the dial by each of said movable means, said indicator hands intersecting upon the dial, and the dial having indicia arranged to show the position of the aircraft center of gravity along said reference line as determined by the point of intersection of said elements.

5. In an aircraft having first ground load support means disposed to one side of the aircraft center of gravity and second ground load support means disposed to the opposite side of the aircraft center of gravity, the combination therewith of means for indicating the position of the aircraft center of gravity along a reference line extending substantially between said first and said second ground load support means, said indicating means comprising: an electrical circuit means in the aircraft for each of said support means, each circuit means including means mounted upon the related support means for varying the current output of the circuit in accordance with the load of the aircraft borne by the related support means; an indicator having a first member movable in response to variation in total current output of both of said circuit means, a second member movable in response to current output variation of one of said circuit means, and said indicator having means to show the position of the aircraft center of gravity along said reference line as determined by the relative positions of said movable members.

6. In an aircraft having first ground load support means disposed to one side of the aircraft center of gravity and second ground load support means disposed to the opposite side of the aircraft center of gravity, the combination therewith of means for indicating the position of the aircraft center of gravity along a reference line extending substantially between said first and said second ground load support means, said indicating means comprising: an electrical circuit means in the aircraft for each of said support means, each circuit means including means mounted upon the related support means for varying the current output of the circuit in accordance with the load of the aircraft borne by the related support means; an indicator having a dial, a first member movable in response to variation in total current output of both of said circuit means, a second member movable in response to current output variation of one of said circuit means, said indicator members intersecting upon the dial, and the dial having indicia arranged to show the position of the aircraft center of gravity along said reference line as determined by the point of intersection of said members.

7. In an aircraft having three ground load supports, one of the supports being spaced horizontally from the other two supports in a direction substantially transverse to a line connecting said other two supports, the combination therewith of means for showing simultaneously the gross weight of the aircraft and the position of the aircraft center of gravity in said substantially transverse direction, said means comprising: a bridge circuit in the aircraft for each of said supports, each bridge circuit including in an arm thereof a resistance wire type strain gage mounted upon the related support for varying the bridge circuit output current in accordance with variation in load of the aircraft borne by said related support, an indicator having first and second hands and operating coils therefor, there being three operating coils for the first indicator hand, each of said three coils being arranged to pass the output current of a different one of said bridge circuits whereby the first indicator hand will move substantially in proportion to the total current output from all of said bridge circuits, the operating coil for the second indicator hand being arranged to pass the output current of the bridge circuit for said one of the supports whereby the indicator hand will move substantially in proportion to the last-mentioned current output, said indicator hands intersecting in various positions thereof, the indicator having a first scale cooperating with the first indicator hand to show the gross weight of the aircraft, and the indicator having a second scale arranged to show the position of the center of gravity of the aircraft in said substantially transverse direction as determined by the point of intersection of said hands.

8. In an aircraft having three ground load supports, one of the supports being spaced horizontally from the other two supports in a direction substantially transverse to a line connecting said other two supports, the combination therewith of means for showing simultaneously the gross weight of the aircraft and the position of the aircraft center of gravity in said substantially transverse direction, said means comprising: a bridge circuit in the aircraft for each of said supports, each bridge circuit including in an arm thereof a resistance type strain gage mounted upon the related support for varying the bridge circuit output current in accordance with variation in load of the aircraft borne by said related support, an indicator having first and second hands and electrical operating means therefor, said electrical operating means for the first indicator hand being electrically connected with bridge circuits of all of said supports in such manner that the first indicator hand will move substantially in proportion to the total current output from all of said bridge circuits, the electrical operating means for the second indicator hand being electrically connected with the bridge circuit of said one of the supports in such manner that the second indicator hand will move substantially in proportion to the current output of the last-mentioned bridge circuit, said indicator hands intersecting in various positions thereof, the indicator having a first scale cooperating with the first indicator hand to show the gross weight of the aircraft, and the indicator having a second scale arranged to show the position of the center of gravity of the aircraft in said substantially transverse direction as determined by the point of intersection of said hands.

9. In an aircraft having three ground load supports, one of the supports being spaced horizontally from the other two supports in a direction substantially transverse to a line connecting said other two supports, the combination therewith of means for showing the position of the aircraft center of gravity in said substantially transverse direction, said means comprising: a bridge circuit in the aircraft for each of said supports, each bridge circuit including in an arm thereof a resistance type strain gage mounted upon the related support for varying the bridge circuit output current in accordance with variation in load of the aircraft borne by said related support, an indicator having first and second indicating elements and operating coils therefor, there being three operating coils for the first indicating element, each of said three coils being energized by the output current of a respective bridge circuit whereby the first indicating element will move substantially in proportion to the total current output from all of said bridge circuits, the operating coil for the second indicating element being energized by the output current of the bridge circuit for said one of the supports whereby the second indicating element will move substantially in proportion to the last-mentioned current output, said first and second indicating elements being located in mutually co-acting position relationship on said indicator, the indicator having indicia arranged to show by the co-acting position relationship of said indicating elements with respect to said indicia the position of the center of gravity of the aircraft in said substantially transverse direction.

10. In an aircraft having first ground load support means disposed to one side of the aircraft center of gravity and second ground load support means disposed to the opposite side of the center of gravity, the combination therewith of means for indicating the position of the aircraft center of gravity along a reference line extending substantially between said first and said second ground load support means, said indicating means comprising: bridge circuit means in the aircraft for each of said support means, each bridge circuit means including resistance type strain gage means mounted upon the related support means for varying the bridge circuit means output current in accordance with variation in load of the aircraft borne by said related support means, an indicator having first and second indicating elements and electrical operating means therefor, the electrical operating means for the first indicating element being electrically connected with the bridge circuit means of both of said support means in such manner that the first indicating element will move substantially in proportion to the total current output from both of said bridge circuit means, the electrical operating means for the second indicating element being electrically connected with the bridge circuit means of only said first support means whereby the second indicating element will move substantially in proportion to the current output of the last mentioned circuit means, said first and second indicating elements being located in mutually co-acting position relationship on said indicator, and the indicator having indicia arranged to show by the co-acting position relationship of said indicating elements the position of the center of gravity of the aircraft along said reference line.

11. In an aircraft having first ground load support means forward of the aircraft center of gravity and second ground load support means aft of the center of gravity, the combination therewith of means for indicating simultaneously the weight of the aircraft and the fore and aft location of the aircraft center of gravity, said indicating means comprising: bridge circuit means in the aircraft for each of said support means, each bridge circuit means including resistance type strain gage means mounted upon the related support means for varying the bridge circuit means output current in accordance with variation in load of the aircraft borne by said related support means, an indicator having first and second indicating elements and electrical operating means therefor, the electrical operating means for the first indicating element being electrically connected with the bridge circuit means of both of said support means in such manner that the first indicating element will move substantially in proportion to the total current output from both of said bridge circuit means, the electrical operating means for the second indicating element being electrically connected with the bridge circuit means of only one of said support means whereby the second indicating element will move substantially in proportion to the current output of the last mentioned circuit means, said first and second indicating elements being located in mutually co-acting position relationship on said indicator, the indicator having a scale cooperating with said first indicating element to show weight of the aircraft, and having indicia arranged to show by the co-acting position relationship of said first and second indicating elements the fore and aft location of the center of gravity of the aircraft.

12. In combination with an aircraft having first ground load support means disposed forward of the aircraft center of gravity and second ground load support means disposed aft of the center of gravity, means for indicating simultaneously the weight of the aircraft and the fore and aft location of the aircraft center of gravity, comprising electrical bridge circuit means for each of said support means, each bridge circuit means including resistance type strain gage means mounted upon the related support means for varying the bridge circuit means output current in accordance with variation in load of the aircraft borne by said related support means, an indicator having first and second indicating elements and electrical operating means therefor, the electrical operating means for the first indicating element being electrically connected with the bridge circuit means of said fore and aft support means so as to be energized according to the total current output from the respective bridge circuit means, and the electrical operating means for the second indicating element being electrically connected with the bridge circuit means of but one of said support means so as to be energized according to the current output of said last-named circuit means, said first and second indicating elements being positioned in angular relationship on said indicator so as to define a shiftable point by the relative positioning of said elements, said indicator having a scale cooperating with said first indicating element to show weight of the aircraft and having indicia arranged to show according to the position of said point established by the relative positioning of said first and second indicating elements the fore and aft location of the center of gravity of the aircraft.

13. In combination with an aircraft having first ground load support means disposed forward of the aircraft center of gravity and second ground load support means disposed aft of the center of gravity, means for indicating simultaneously the weight of the aircraft and the fore and aft location of the aircraft center of gravity, comprising electrical bridge circuit means for each of said support means, each bridge circuit means including resistance type strain gage means mounted upon the related support means for varying the bridge circuit means output current in accordance with variation in load of the aircraft borne by said related support means, an indicator having first and second pointer elements and electromagnetic operating means therefor, the electromagnetic operating means for the first pointer element being electrically connected with the bridge circuit means of said fore and aft support means so as to be energized according to the total current output from both said bridge circuit means, and the electromagnetic operating means for the second pointer element being electrically connected with the bridge circuit means of but one of said support means so as to be energized according to the current output of said last-named circuit means, said first and second pointer elements being positioned in intersecting relationship on said indicator so as to define a shiftable point by the relative positioning of said elements, said indicator having a scale cooperating with said first pointer element to show weight of the aircraft and having indicia arranged to show according to the position of said point established by the relative positioning of said first and second pointer elements the fore and aft location of the center of gravity of the aircraft.

14. In combination with an aircraft having first ground load support means disposed forward of the aircraft center of gravity and second ground load support means disposed aft of the center of gravity, means for indicating the fore and aft location of the aircraft center of gravity, comprising electrical bridge circuit means for each of said support means, each bridge circuit means including resistance type strain gage means mounted upon the related support means for varying the bridge circuit means output current in accordance with variation in load of the aircraft borne by said related support means, an indicator having first and second pointer elements and electrical operating means therefor, the electrical operating means for the first pointer element being electrically connected with the bridge circuit means of said fore and aft support means so as to be energized according to the total current output from both said bridge circuit means, and the electrical operating means for the second pointer element being electrically connected with the bridge circuit means of but one of said support means so as to be energized according to the current output of said last-named circuit means, said first and second pointer elements being positioned in intersecting relationship on said indicator so as to define a shiftable point by the relative positioning of said elements, said indicator having indicia arranged to show according to the position of said point established by the relative positioning of said first and second indicating elements the fore and aft location of the center of gravity of the aircraft.

EDWARD R. GOODLETT.
HERBERT W. WISHART.

REFERENCES CITED

The following references are of record in the file of this patent:

UNITED STATES PATENTS

| Number | Name | Date |
|---|---|---|
| 791,785 | Hertzberg et al. | June 6, 1905 |
| 1,407,078 | Murray | Feb. 21, 1922 |
| 1,605,779 | Rissmann | Nov. 2, 1926 |
| 1,621,093 | Troll | Mar. 15, 1927 |
| 1,864,876 | Westrum | June 28, 1932 |
| 2,179,822 | Imm | Nov. 14, 1939 |
| 2,252,464 | Kearns et al. | Aug. 12, 1941 |
| 2,255,814 | Roche | Sept. 16, 1941 |
| 2,365,494 | Schlieben et al. | Dec. 19, 1944 |
| 2,373,504 | Schlieben et al. | Apr. 10, 1945 |
| 2,470,069 | Davies | May 10, 1949 |

FOREIGN PATENTS

| Number | Country | Date |
|---|---|---|
| 387,887 | Great Britain | Feb. 16, 1933 |
| 549,140 | Great Britain | Nov. 9, 1942 |

OTHER REFERENCES

"Characteristics and Aircraft Applications of Wire Resistance Strain Gages," by A. V. de Forest, pages 112, 113, 114, 136, 137 of Instruments, vol. 15, April 1942.

Page 259 of The Scientific American for November 1934.